(12) United States Patent
Kellner

(10) Patent No.: US 10,829,164 B2
(45) Date of Patent: Nov. 10, 2020

(54) BODY MEMBER

(71) Applicant: Dr. Ing. h.c. F. Porsche Aktiengesellschaft, Stuttgart (DE)

(72) Inventor: Philipp Kellner, Rennigen (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 176 days.

(21) Appl. No.: 16/162,567

(22) Filed: Oct. 17, 2018

(65) Prior Publication Data

US 2019/0118869 A1    Apr. 25, 2019

(30) Foreign Application Priority Data

Oct. 19, 2017 (DE) .................. 10 2017 124 394

(51) Int. Cl.
| | |
|---|---|
| *B62D 29/00* | (2006.01) |
| *B60J 5/04* | (2006.01) |
| *B62D 25/02* | (2006.01) |
| *B29C 44/18* | (2006.01) |
| *B62D 25/04* | (2006.01) |
| *B29L 31/30* | (2006.01) |

(52) U.S. Cl.
CPC .......... *B62D 29/002* (2013.01); *B60J 5/0483* (2013.01); *B62D 29/005* (2013.01); *B29C 44/187* (2013.01); *B29L 2031/3002* (2013.01); *B62D 25/025* (2013.01); *B62D 25/04* (2013.01)

(58) Field of Classification Search
CPC .. B62D 29/002; B62D 29/005; B62D 25/025; B62D 25/04; B60J 5/0483; B29C 44/187; B29L 2031/3002
See application file for complete search history.

(56) References Cited

U.S. PATENT DOCUMENTS

2017/0029040 A1    2/2017 Meaige et al.

FOREIGN PATENT DOCUMENTS

| DE | 102 17 713 | 8/2003 |
|---|---|---|
| DE | 10 2010 037 459 | 3/2012 |
| DE | 10 2011 000 450 | 8/2012 |
| DE | 10 2014 104 278 | 10/2015 |
| DE | 11 2015 001 712 | 1/2017 |
| EP | 1 759 964 | 3/2007 |

OTHER PUBLICATIONS

German Office Action dated Sep. 25, 2018.

*Primary Examiner* — Michael C Miggins
(74) *Attorney, Agent, or Firm* — Gerald E. Hespos; Michael J. Porco; Matthew T. Hespos

(57) ABSTRACT

A body member (1; 41) has at least one outer sheet (2), an inner sheet (3) and a reinforcing structure (10) in a cavity (6) bounded by the inner sheet (3) and the outer sheet (2). The reinforcing structure (10) has at least three ribs (11-15) that extend from the outer sheet (2) toward the inner sheet (3). An expanded structural foam connects at least one of the two outer ribs (11, 15) to the inner sheet (3).

15 Claims, 2 Drawing Sheets

BODY MEMBER

CROSS REFERENCE TO RELATED APPLICATION

This application claims priority under 35 USC 119 to German Patent Appl. No. 10 2017 124 394.1 filed on Oct. 19, 2017, the entire disclosure of which is incorporated herein by reference.

BACKGROUND

Field of the Invention

The invention relates to a body having at least one outer sheet, an inner sheet and a reinforcing structure arranged in a cavity bounded by the inner and outer sheets. The reinforcing structure has ribs that extend from the outer sheet toward the inner sheet and an expanded structural foam connects the reinforcing structure to the inner sheet. The invention also relates to a method for producing a body member of this type.

Related Art

German Laid-Open application DE 10 2011 000 450 A1 discloses a support structure for a vehicle. The support structure has a first profile part that is to be subjected to a compressive load, and a second profile part that is to be subjected to a tensile load. The profile parts are connected to each other and form a hollow structure element. A reinforcing element is arranged within the structural element, and an expanded adhesive material connects the structural element to the reinforcing element. The expanded adhesive material is arranged only partially between the structural element and the reinforcing element. Thus, the reinforcing element has at least one portion that faces the second profile part and is surrounded on at least three sides in cross section by the expanded adhesive material. The first profile part with the reinforcing element is a hybrid component to which the second profile part is fastened directly in the flange region. The second profile part has an intermediate layer made of expanded adhesive material at least over part of the length on the side facing the hybrid component.

German Laid-Open application DE 10 2010 037 459 A1 discloses a member for use in a motor vehicle. The member has at least first and second components that form a hollow closed support profile. The first component has a shell-shaped profile, and the second component has a portion with a shell-shaped profile. The two components lie against each other and are connected in their shell-shaped regions. The second component has a ribs supported on the first component in the region of an inner wall thereof. The shell-shaped portion and the rib-shaped portion of the second component are produced independently and are connected to each other after production by a joining technique, for example by adhesive bonding.

German publication DE 11 2015 001 712 T5 discloses a vehicle frame structure comprising an elongate hollow frame with a multiplicity of inner sides. A reinforcing element formed from a thermoplastic polymer is arranged in the elongate hollow frame for reinforcing each inner side of the elongate hollow frame element in a plane orthogonal to a longitudinal axis of the elongate hollow frame. Recesses are defined in the hollow frame so that the reinforcing element is spaced apart along parts therefrom from each inner side. Structural foam formed from a heat-activated epoxy is fit between the reinforcing element and the elongate hollow frame element.

It is an object of the invention to create a particularly stable and extremely highly loadable body.

SUMMARY

The object is achieved in the case of a body member having an outer sheet, an inner sheet and a reinforcing structure arranged in a cavity bounded by the inner and outer sheets. The reinforcing structure comprises ribs extending from the outer sheet toward the inner sheet, and an expanded structural foam connects the reinforcing structure to the inner sheet. The reinforcing structure comprises at least three ribs that extend toward the inner sheet and at least an outer one of the three ribs is connected to the inner sheet by the expanded structural foam. Thus, a stable and highly loadable connection between the outer and inner sheets can be achieved. The middle of the ribs advantageously does not need to be connected to the inner sheet by the expanded structural foam. Thus, the cavity between the inner and outer sheets is not filled with the reinforcing structure and is not need filled with the expanded structural foam. This considerably simplifies the production of the body member.

The reinforcing structure in one embodiment comprises at least one rib that extends toward the inner sheet and has a free end spaced apart from the inner sheet. This further simplifies the production of the body. Nevertheless, the body member is extremely highly loadable because of the connection between the inner and outer sheets by at least one of the two outer ribs of the reinforcing structure.

The reinforcing structure may comprise at least two ribs, as viewed in cross section, that extend between the two outer ribs in the direction of the inner sheet and are spaced apart at their free ends at different distances from the inner sheet. Thus, the stability and/or strength of the body member can be increased in a simple manner. According to one embodiment, three ribs are arranged between the two outer ribs, as viewed in cross section. The central rib may be shorter than the two ribs adjacent thereto and also is shorter than the two outer ribs of the reinforcing structure.

A variation of the above-described embodiments may have an outer one of the ribs connected laterally on the outside to the inner sheet by the expanded structural foam. Thus, stable fastening between the outer and inner sheets is provided in a simple manner via the reinforcing structure.

A variation of the above-described embodiments may have an outer one of the ribs connected at a free end both to the inner sheet and to the outer sheet by the expanded structural foam. Thus, the inner sheet is connected directly to the outer sheet by the expanded structural foam, and the expanded structural foam advantageously can provide sealing between inner and outer sheets.

The reinforcing structure may be formed from a fiber-reinforced plastics material. The plastics material may be a thermoplastic material. Reinforcing fibers, such as glass fibers, may be embedded in the plastics material for reinforcement purposes. Alternatively or additionally, aramid fibers, basalt fibers, natural fibers and/or carbon fibers can be used as the reinforcing fibers. The plastics material is, for example, polyamide.

The inner sheet and the outer sheet may be formed from metal and may be connected to each other in a flat and/or punctiform and/or linear manner via corresponding flanges. The metal is, for example, aluminum or steel. The steel is preferably a high-strength or an ultra-high-strength steel.

The reinforcing structure may have at least one recessed receiving region for the structural foam. The recessed receiving region for the structural foam may be a channel that functions for receiving a foam bead. The foam bead may be extruded on the channel for protection of the foam bead during the further logistical process.

The outer sheet may be combined with a metal reinforcing sheet that extends into at least one outer rib of the reinforcing structure. The outer rib of the reinforcing structure can be connected to the outer sheet in a particularly stable manner via the metal reinforcing sheet. The metal reinforcing sheet may be connected to the outer sheet in an integrally bonded manner. Part of the metal reinforcing sheet may be insert-molded with the outer rib of the reinforcing structure.

The invention also relates to a method for producing an embodiment of the above-described body. In accordance with the method, the expandable structural foam is in the form of beads and is fit onto two outer ribs of the reinforcing structure, before the structural foam in the mounted body member expands to connect the outer sheet to the inner sheet via the reinforcing structure. The structural foam is applied to the hybrid component composed of the outer sheet with the reinforcing structure, for example by injection molding or by application of a bead along the component geometry, in particular parallel to the flanges. The structural foam then expands during a coating process, for example during cathodic dip-coating drying.

The invention also relates to a motor vehicle having the above-described body member. The body member may be an A pillar, in particular of a convertible. However, the body member may also be a B pillar of a closed motor vehicle. Depending on the embodiment, the body member may also be an end-wall cross member of the motor vehicle. Alternatively or additionally, the body member can constitute a lateral roof frame that connects an A pillar and a B pillar. The claimed body member can result in a significant reduction in weight for maximum loads and can be produced cost-effectively, even in large-scale production.

Further advantages, features and details of the invention emerge from the description below in which various exemplary embodiments are described in detail with reference to the drawing.

DETAILED DESCRIPTION

Figure 1:
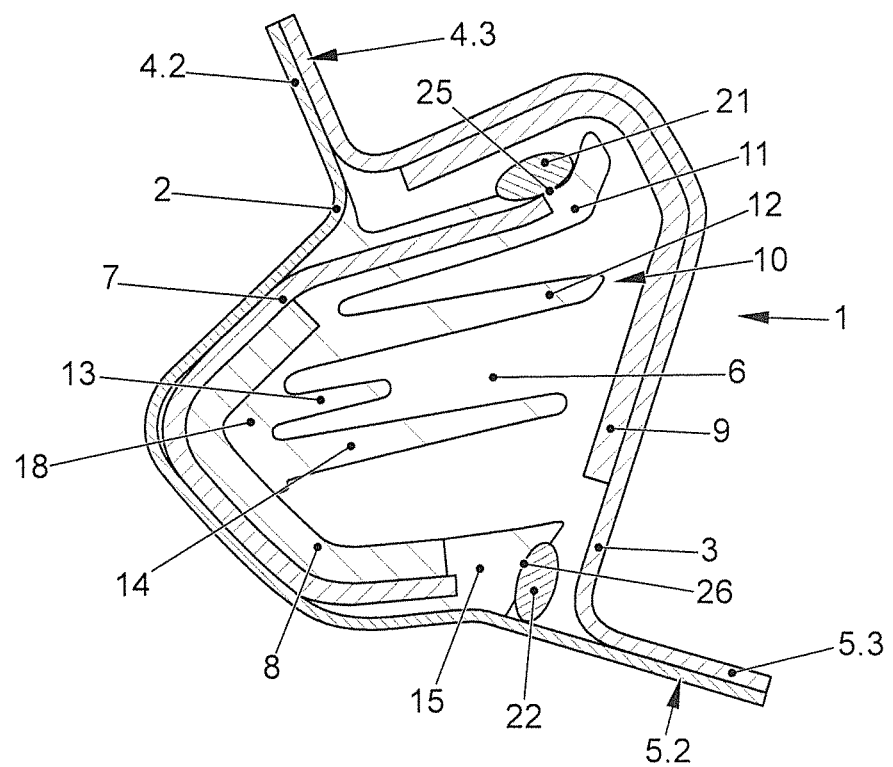
FIG. 1 is a cross section of a body member according to a first embodiment with two expanding structural foam beads.
Figure 2:
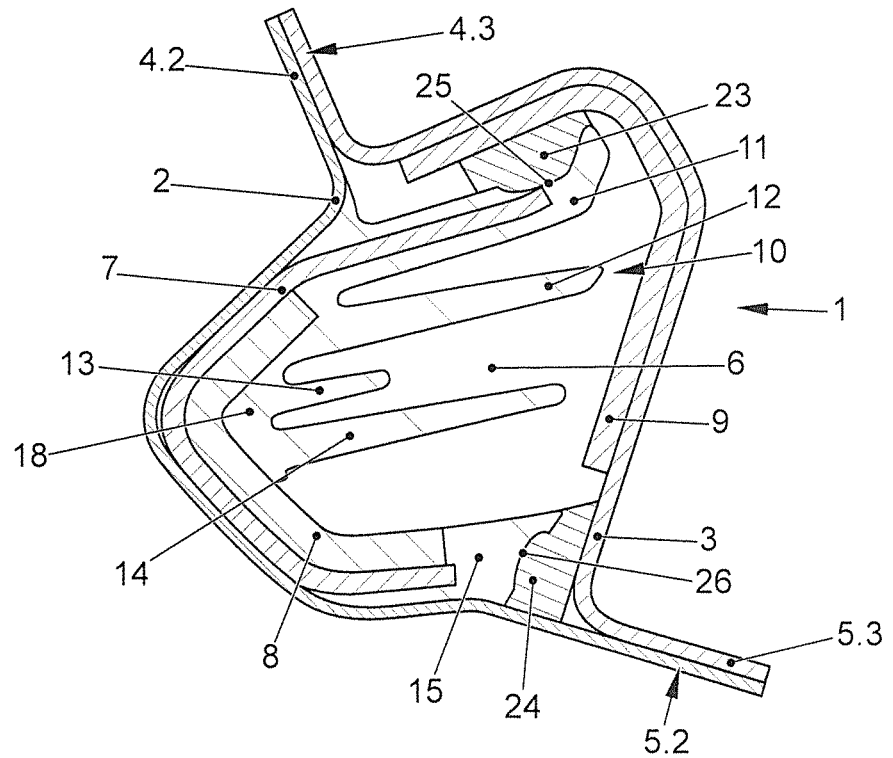
FIG. 2 shows the body member of FIG. 1 with expanded structural foam.
Figure 3:
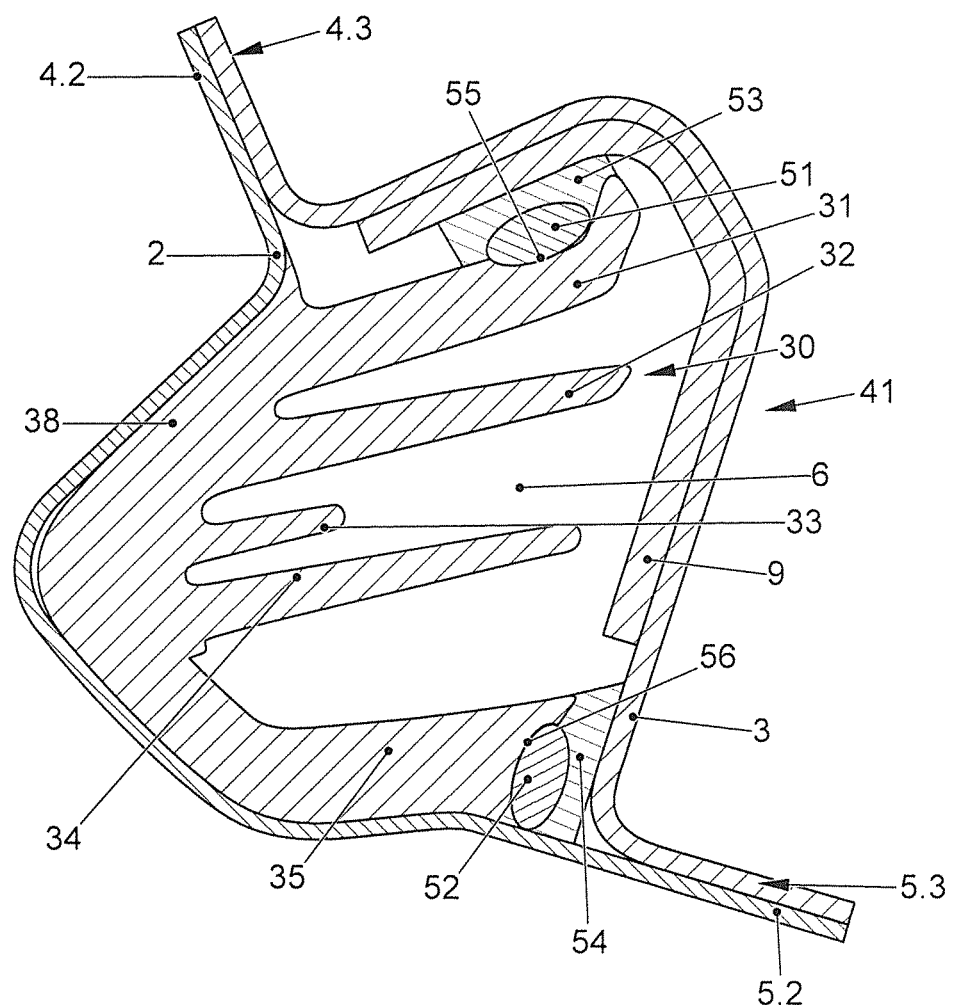
FIG. 3 is a cross section of the body member from FIG. 1 with expanded structural foam according to a second exemplary embodiment.

FIGS. 1 to 3 illustrate two exemplary embodiments of a body member 1; 41 in cross section. The body member 1; 41 comprises an outer sheet 2 and an inner sheet 3. The outer sheet 2 has a substantially U-shaped cross-sectional profile, from which two flanges 4.2 and 5.2 emerge.

The inner sheet 3 likewise has a substantially U-shaped profile, from which two flanges 4.3 and 5.3 emerge. The outer sheet 2 is connected to the inner sheet 3 in an integrally bonded manner via the flanges 4.2, 5.2 and 4.3, 5.3.

The outer sheet 2 and the inner sheet 3 bound a cavity 6, and a reinforcing structure 10; 30 is arranged in the cavity 6.

The body member 1; 41 of this embodiment is used as an A pillar in a motor vehicle. The flanges 5.2 and 5.3 are arranged in a direction of travel of a motor vehicle equipped with the body member 1; 41, that is to say toward a windshield of the motor vehicle. The two flanges 4.2 and 4.3 are arranged at the rear in the direction of travel of the motor vehicle, that is to say toward a door of the motor vehicle.

The flanges 4.2, 4.3 and 5.2, 5.3 advantageously are bonded adhesively and also are spot-welded to provide a stable connection. The flanges 4.2 and 5.2 are connected integrally to the outer sheet 2, and the flanges 4.3 and 5.3 are connected integrally to the inner sheet 3. The inner sheet 3 and the outer sheet 2 advantageously are formed from an ultra-high-strength, hot-formed steel.

The body member 1 of FIGS. 1 and 2 also comprises a metal reinforcing sheet 7, an organic sheet 8 and a reinforcing sheet 9 for reinforcement. The metal reinforcing sheet 7 advantageously is formed, like the reinforcing sheet 9, from an ultra-high-strength, hot-formed steel. The organic sheet 8 advantageously is formed from a polyamide, in which endless fibers are embedded for reinforcement purposes.

The metal reinforcing sheet 7 is connected to the outer sheet 2 in an integrally bonded manner, and the organic sheet 8 is connected to the metal reinforcing sheet 7 in an integrally bonded manner. The metal reinforcing sheet 7 therefore is arranged between the outer sheet 2 and the organic sheet 3.

An upper end, in FIGS. 1 and 2, as viewed in cross section, of the metal reinforcing sheet 7 projects into the cavity 6 and is insert-molded with an outer rib 11 of the reinforcing structure 10. The reinforcing structure 10 is formed from a polyamide into which short glass fibers are embedded for reinforcement purposes.

An outer rib 15 of the reinforcing structure 10 is connected to a base 18 of the reinforcing structure 10 via the metal reinforcing sheet 7 and the organic sheet 8.

Three ribs 12, 13, 14 project from the base 18 of the reinforcing structure 10 and extend between the outer ribs 11 and 15 from the outer sheet 2, in more precise terms from the organic sheet 8 or the base 18, in the direction of the reinforcing sheet 9, which is connected to the inner sheet 3 in an integrally bonded manner.

A central rib 13 is shorter than its adjacent ribs 12 and 14. The ribs 12 and 14 are slightly spaced apart from the reinforcing sheet 9 and the inner sheet 3.

A structural foam bead 21 is arranged in a recessed receiving region 25 laterally on the outside of the outer rib 11, as shown in FIG. 1. The structural foam bead 21 has contact with the outer rib 11 and also has contact with a free end of the metal reinforcing sheet 7 that is embedded in the outer rib 11.

A structural foam bead 22 is arranged in a recessed receiving region 26 at a free end of the outer rib 15. The structural foam rib 22 has contact with the outer rib 15 and also has contact with the outer sheet 2.

The body member 1 illustrated in FIG. 1 is coated in a cathodic dip-coating process. For corrosion protection, the coating is burned in under the action of heat. During the burning-in operation, the body member 1 is exposed to temperatures of, for example, 180°-190° C. In the process, the structural foam that is attached to the outer ribs 11 and 15 in the form of the structural foam beads 21, 22 expands.

During expansion, the structural foam 23, 24 of FIG. 2 swells and adhesively bonds to the inner sheet 2. During curing, the structural foam 23, 24 becomes hard and creates an additional stable connection between the outer sheet 2 and the inner sheet 3 via the reinforcing structure 10. Thus, stable support between the inner and outer sheets 3 and 2 is realized in the cavity 6.

The body member 41 illustrated in FIG. 3 includes a reinforcing structure 30 having five ribs 31 to 35 in the cavity 6. The reinforcing structure 30 comprises a base 38 that is connected to the outer sheet 2 in an integrally bonded manner.

The ribs 31 to 35 are integral with the base 38. In contrast to FIGS. 1 and 2, the body member 41 does not comprise a metal-reinforcing sheet (7 in FIG. 1) and an organic sheet (8 in FIG. 1). Thus production costs can be reduced.

The outer ribs 31 and 35 of the reinforcing structure 30, as in the case of the body member 1 illustrated in FIGS. 1 and 2, are connected fixedly to the inner sheet 3 or to the inner and outer sheets 3 and 2 by the expanded structural foam 54, 55.

As in the previous embodiment, the structural foam is introduced as structural foam beads 51, 52 in recessed receiving regions 55, 56 of the outer ribs 31 and 35 before the body member 41 is subjected to a cathodic dip-coating process.

What is claimed is:

1. A body member comprising at least one outer sheet, an inner sheet and a reinforcing structure arranged in a cavity bounded by the inner sheet and the outer sheet, the reinforcing structure having at least three ribs extending from the outer sheet toward the inner sheet, the at least three ribs including first and second outer ribs, at least the first outer rib having a free end spaced from the inner sheet and at least a first area of expanded structural foam extending between and connecting the free end of the first outer rib and the inner sheet.

2. The body member of claim 1, wherein the at least three ribs of the reinforcing structure includes at least two intermediate ribs disposed between the first and second outer ribs and the at least two intermediate ribs have free ends spaced at different distances from the inner sheet.

3. The body member of claim 1, wherein the first area of the expanded structural foam further extends to and contacts an area of the outer sheet between the free end of the second outer rib and the inner sheet.

4. The body member of claim 1, wherein the inner sheet and the outer sheet are formed from metal and are connected to each other in a flat and/or punctiform and/or linear manner via corresponding flanges.

5. The body member of claim 1, wherein the reinforcing structure has at least one recessed receiving region for the structural foam.

6. The body member of claim 1 wherein the second outer rib has a free end spaced from the inner sheet.

7. The body member of claim 1, wherein the second outer rib has a free end spaced from the inner sheet and a laterally outer side adjacent the free end of the second outer rib, the lateral outer side of the second outer sheet facing away from the first outer rib, the body member further comprising a second area of expanded structural foam extending between and connecting the inner sheet to the laterally outer side of the second outer rib at a location adjacent the free end of the second outer rib.

8. The body member of claim 7 further comprising a first recess disposed in the free end of the first outer rib, the first area of the expanded structural foam being engaged in the first recess.

9. The body member of claim 8, further comprising a second recess disposed in an outwardly facing surface of the second outer rib, the second area of the expanded structural foam being engaged in the second recess.

10. The body member of claim 1, wherein the reinforcing structure is formed from a fiber-reinforced plastics material.

11. The body member of claim 10, further comprising a metal reinforcing sheet having at least one end region that is inserted molded into at least one of the first and second outer ribs of the reinforcing structure so that the at least one end region of the metal reinforcing sheet has at least two opposite surfaces engaged by the fiber-reinforced plastics material of the reinforcing structure.

12. The body member of claim 11, wherein the outer sheet and the reinforcing structure are connected to each other and are defined as a metal/plastics hybrid component.

13. The body member of claim 1, further comprising an inner metal reinforcing structure secured in face-to-face contact with a surface of the inner sheet facing into the cavity defined between the inner sheet and the outer sheet.

14. The body member of claim 13, wherein the inner metal reinforcing sheet is spaced from the first and second outer ribs of the reinforcing structure.

15. A method for producing the body member of claim 7, comprising fitting the first and second areas of the expandable structural foam in the form of first and second spaced apart beads onto the first and second outer ribs of the reinforcing structure and then heating the body member sufficiently so that the structural foam in the body member expands to connect the outer sheet to the inner sheet via the reinforcing structure.

* * * * *